(12) United States Patent
Chong et al.

(10) Patent No.: US 7,650,420 B2
(45) Date of Patent: Jan. 19, 2010

(54) SYSTEM AND METHOD FOR CONTENT FILTERING

(75) Inventors: Lester J Chong, San Jose, CA (US); Michael Makaijani, San Mateo, CA (US); Douglas Cheline, San Jose, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/141,797

(22) Filed: Jun. 18, 2008

(65) Prior Publication Data

US 2008/0250484 A1    Oct. 9, 2008

Related U.S. Application Data

(63) Continuation of application No. 10/040,770, filed on Dec. 28, 2001, now abandoned.

(51) Int. Cl.
 *G06F 15/16* (2006.01)
(52) U.S. Cl. ............... 709/229; 709/203; 709/245
(58) Field of Classification Search ......... 709/203, 709/213, 219, 225, 229, 239, 245; 707/10
See application file for complete search history.

(56) References Cited

U.S. PATENT DOCUMENTS

| 5,623,601 | A | 4/1997 | Vu ..................... 726/12 |
| 5,781,550 | A | 7/1998 | Templin et al. ......... 370/401 |
| 5,826,014 | A | 10/1998 | Coley et al. ............ 726/12 |
| 5,987,606 | A | 11/1999 | Cirasole et al. ......... 726/11 |
| 5,991,810 | A | 11/1999 | Shapiro et al. ......... 709/229 |
| 6,182,141 | B1 | 1/2001 | Blum et al. ............ 709/227 |
| 6,182,226 | B1 | 1/2001 | Reid et al. ............. 726/15 |
| 6,219,786 | B1 | 4/2001 | Cunningham et al. ..... 713/152 |
| 6,233,618 | B1 | 5/2001 | Shannon .............. 709/229 |
| 6,292,839 | B1 | 9/2001 | Naudus et al. ......... 709/238 |
| 6,389,462 | B1 | 5/2002 | Cohen et al. .......... 709/218 |
| 6,460,084 | B1 | 10/2002 | Van Horne et al. ..... 709/227 |
| 6,473,406 | B1 | 10/2002 | Coile et al. ........... 370/248 |
| 6,606,650 | B2 | 8/2003 | Hughes et al. ......... 709/213 |

(Continued)

OTHER PUBLICATIONS

Internet Products, Inc. "IPrism Overview", publicly posted Nov. 12, 2001, <http://web.archive.org/web/20011121150533/www.internetproducts.com/products/iprism1>, 2 pages.

(Continued)

*Primary Examiner*—George C Neurauter, Jr.

(57) ABSTRACT

The system for content filtering includes at least one content server that stores content. The system also includes at least one client computer configured to transmit a request for the content to the at least one content server. The request contains an address of the content server and a port number associated with such a request for the content. A gateway is coupled to the at least one client computer. The gateway is configured to receive and renumber the request with a new rarely used port number associated with a filter privilege of a user of the at least one client computer. The system also includes a content filtering server, configured to block restricted content based on the filter privilege. Finally, a switch is coupled to the gateway, the content filtering server, and the content server. The switch is configured to listen for the request on the rarely used port number and to redirect the request to the content filtering server.

21 Claims, 6 Drawing Sheets

U.S. PATENT DOCUMENTS

| | | | |
|---|---|---|---|
| 6,754,709 B1 | 6/2004 | Gbadegesin | 709/227 |
| 6,772,214 B1 | 8/2004 | McClain et al. | 709/229 |
| 2002/0112076 A1 | 8/2002 | Rueda et al. | 709/245 |
| 2003/0014659 A1 | 1/2003 | Zhu | 713/200 |
| 2003/0055962 A1 | 3/2003 | Freund et al. | 709/225 |

OTHER PUBLICATIONS

Marsan, Carolyn Duffy. "Internet Filtering hardware unveiled", published by Network World, Inc., Nov. 1, 1999, 1 page.

SonicWall, Inc. "SonicWALL SOHO Internet Security Appliance", document revision A, part # 232-000019-00, Nov. 1999 140 pages.

Request for Comments: 1105, "A Border Gateway Protocol (BGP)" http://www.ietf.org/rfc/rfc1105.txt?number=1105 (Nov. 23, 2001).

Request for Comments: 1122, "Requirements for Internet Hosts—Communication Layers", http://www.ietf.org/rfc/rfc1122.txt?number=1122 (Oct. 31, 2001).

Request for Comments: 1163, "A Border Gateway Protocol (BGP)", http://www.ietf.org/rfc/rfc1163.txt?number=1163 (Nov. 23, 2001).

Request for Comments: 1164, "Application of the Border Gateway protocol in the Internet", http://www.ietf.org/rfc/rfc1164.txt?number=11634 (Nov. 23, 2001).

Request for Comments: 1265, "BGP Protocol Analysis", http://www.ietf.org/rfc/rfc1265.txt?number=1265 (Nov. 23, 2001).

Request for Comments: 1266, "Experience with the BGP Protocol", http://www.ietf.org/rfc/rfc1266.txt?number=1266 (Nov. 23, 2001).

Request for Comments: 1267, "A Border Gateway Protocol 3 (BGP-3)", http://www.ietf.org/rfc/rfc1267.txt?number=1267 (Nov. 23, 2001).

Request for Comments: 1268, "Application of the Border Gateway Protocol in the Internet", http://www.ietf.org/rfc/rfc1268.txt?number=1268 (Nov. 23, 2001).

Request for Comments: 1269, "Definitions of Managed Objects for the Border Gateway Protocol (Version 3)", http://www.ietf.org/rfc/rfc1269.txt?number=1269 (Nov. 23, 2001).

Request for Comments: 1364, "BGP OSPF Interaction", http://www.ietf.org/rfc/rfc1364.txt?number=1364 (Nov. 23, 2001).

Request for Comments: 1397, "Default Route Advertisement in BGP2 and BGP3 Versions of the Border Gateway Protocol", http://www.ietf.org/rfc/rfc1397.txt?number=1397 (Nov. 23, 2001).

Request for Comments: 1403, "BGP OSPF Interaction", http://www.ietf.org/rfc/rfc1403.txt?number=1403 (Nov. 23, 2001).

Request for Comments: 1716, "Towards Requirements for IP Routers", http://www.ietf.org/rfc/rfc1716.txt?number=1716 (Nov. 26, 2001).

SYSTEM AND METHOD FOR CONTENT FILTERING

CROSS-REFERENCE TO RELATED APPLICATIONS

This application is a continuation of U.S. patent application Ser. No. 10/040,770, filed on Dec. 28, 2001 now abandoned. The disclosure of the above application is incorporated herein by reference.

FIELD

The disclosure relates to a content filtering system, and more particularly to a system and method of controlling user access to a computer network by means of a content filtering system that does not require a user to download, install, or configure filtering software on the user's client computer.

BACKGROUND

The Internet is a loose network of networked computers spread throughout the world. These networked computers form part of a client-server model, where each networked computer is either a client, a server, or a combination client and server. The servers store and transmit content, such as data files, Web pages, or the like, to the clients. A large proportion of the content stored on these servers is publicly accessible.

This content is typically located through a naming convention, known as a Uniform Resource Identifier (URI) from which a Uniform Resource Locator (URL) is created. URLs such as HTTP:// and FTP:// are specific subsets of URIs and are used to address every file on the Internet. In general, a URL is written as follows: [<scheme>:<scheme-specific-part>]. The <scheme> portion of the URL identifies the scheme is being utilized, such as File Transfer Protocol (FTP), Hypertext Transfer Protocol (HTTP), the Gopher Protocol, Wide Area Information Servers (WAIS), USENET News Protocol (News), the Prospero Directory Service (Prospero), or the like. The <scheme-specific-part> portion of the URL identifies the actual location of the file. A Domain Name System (DNS) is then used to convert the domain name of a specific computer on the network into a corresponding unique Internet Protocol (IP) address, such as 204.171.64.2.

Users typically access this content in one of two ways. The user can enter a URL into a text or address box on a Graphical User Interface (GUI) of a file manager or an Internet browser, such as MICROSOFT'S INTERNET EXPLORER, and click "Go" or press "Enter." Alternatively, the user can click on a Hyperlink. The Hyperlink links a displayed object, such as text or an icon, to a file addressed by a URL.

As the Internet grows in size and sophistication, more and more content is becoming accessible to users. This content can be easily accessed by anyone who has a client computer and Internet access. However, some of this content may be unsuitable or inappropriate for all Internet users. For example, violent or adult content may be inappropriate for children. Therefore, in some situations it is desirable to limit and/or control user access to such content. In addition, employers may want to restrict their employees from viewing certain content on the Internet while at work. Likewise, parents may wish to block their child's access to violent, adult, or hate related content on the Internet.

This restriction and/or control of user access to content on the Internet is otherwise known as content filtering. Content filtering allows a system administrator to block or limit content based on one or more criteria, such as traffic type, file type, Web site, or the like. For example, Web access might be permitted, but file transfers may not.

There have been numerous attempts to provide content filtering using special browsers and filtering programs. These special browsers and filtering programs typically screen Web pages by word content, site rating, or by URL. The software provider of the special browsers or filtering programs typically keep a master list of objectionable URLs or Web sites that must be periodically updated in the special browser or filtering program on the user's client computer.

However, these existing content filtering systems have a number of drawbacks. First, they need to be installed and configured on each and every client computer where controlled access is desired. Such installation and configuration can be time-consuming, inconvenient, and require a basic understanding of computer hardware and software. Additionally, from time to time, the user may be required to install bug-fixes, patches or updates to configure or maintain the filtering software. This is because additional URLs or Web sites must be continually added to a list of restricted sites. Often, this list must be updated by periodically downloading it to a user's client computer. Moreover, the software and list of restricted sites may consume client computer memory, which, in some cases, may limit or affect overall client computer performance.

What is more, many children are typically more computer savvy than their parents and may find ways to circumvent the content filtering software without their parent's knowledge.

Another approach to content filtering has been to place filtering software on a proxy server, so that entire networks connected to the proxy server can be filtered. The proxy server typically contains an updatable list of restricted URLs or Web sites. However, each client computer connected to the proxy server must typically also include software that includes the filtering requirements appropriate for that particular client computer. Again this requires software to be installed and configured for each client computer. This is not only time consuming and inconvenient, but may consume much of a system administrator's time. If each client computer is not appropriately configured, users may be blocked from content that they should otherwise have access to. Conversely, children and other restricted users may be able to get access to inappropriate content using a particular client computer that has not been configured to restrict such content.

In addition, updating lists of objectionable URLs or Web sites is itself a challenge, as it has been estimated that approximately two million Web pages are added to the Internet each day. What is more, Internet search engines tend to display search results with the most recent content listed first. As a result, inappropriate Web sites may actually be listed first in a list of search results, thereby rendering filtering software that does not include these Web sites on its restricted list, ineffectual.

Conventional content filtering has several other limitations. For example, if a filter list is broad and attempts to provide heightened restrictions, appropriate content may be invariably filtered out along with inappropriate or blocked content. On the other hand, if the filter list is too narrow, inappropriate content is more likely to be accessible. Most importantly, the above systems provide content filtering on a computer by computer basis, i.e., they do not offer content filtering flexibility for different users using the same computer.

Therefore, a need exists for a content filtering system that is easily provisioned for one or more client computers. Furthermore, a need exists to provide a simple content filtering system that does not require installation and configuration of software on the user's client computer. Moreover, a need exists for a filtering system that cannot easily be circumvented, bypassed, tampered with, or disabled at the client computer level.

SUMMARY

According to the disclosure there is also provided a remotely configurable content filtering system. This content filtering system provides users with the ability to filter content on a network, and set time limits on accessibility to such content. For example, a parent can limit the access that a child has to Web sites by blocking access to Web sites that contain content unsuitable for children. The parent can also configure the content filtering system to block different sets of Web site categories for different children, based on the age of each child. The content filtering settings can also be made client-computer-specific. For example, if an adult is using one client-computer and a child is using another client-computer, the content filtering can be turned off for the client-computer being used by the adult and turned on for the client-computer being used by the child.

The content filtering system is transparent to the user and no software has to be loaded on the user's client-computers. What is more, no special configuration of the user's web-browser is required. The default state of the content filtering system is that content filtering will be activated. The content filtering process is performed on the network and not on the individual client-computers. Therefore an individual other than the control setting authority (for example, the parent) will not be able to bypass the content filtering controls previously set.

According to the disclosure there is provided a method for content filtering. A request for content is received from a client computer, where the request includes a port number assigned to an application program running on the client computer. It is then determined that the port number is a predetermined port number associated with a request for content. The request is renumbered with a new port number and transmitted to a content filtering server that is configured to listen for requests on the new port number. An indication of whether the content is restricted based on the request and the new port number is then obtained from the content filtering server.

Further according to the disclosure there is provided content filtering gateway. The content filtering gateway comprises a Central Processing Unit (CPU), communications circuitry, input/output ports, and a memory. The memory contains an operating system, a port sniffer, and a database of filtering privileges and associated rarely used port numbers. The memory also comprises filtering procedures. The filtering procedures comprise instructions for receiving a request for content from a client computer, where the request includes a port number assigned to an application program running on the client computer, and instructions for determining that the port number is a predetermined port number associated with a request for content. The filtering procedures also comprise instructions for renumbering the request with one of the rarely used port numbers, instructions for transmitting the request with the one of the rarely used port numbers to a content filtering server that is configured to listen for requests on the new port number, and instructions for obtaining from the content filtering server an indication of whether the content is restricted based on the request and the one of the rarely used port numbers.

Still further according to the disclosure there is provided a system for content filtering. The system comprises at least one content server that stores content, and at least one client computer configured to transmit a request for the content to the at least one content server. The request contains an address of the content server and a port number associated with the request for the content. The system also comprises a gateway coupled to the at least one client computer. The gateway is configured to receive and renumber the request with a new rarely used port number associated with a filter privilege of a user of the at least one client computer. Additionally, the system includes a content filtering server, configured to block restricted content based on the filter privilege, and a switch coupled to the gateway, the content filtering server, and the at least one content server. The switch is configured to listen for the request on the rarely used port number and to redirect the request to the content filtering server.

Content blocking or filtering functionality will restrict children or unauthorized users from accessing Web sites that contain content to which the control setting authority wants to restrict access. Additionally, a network time restriction feature is described that will allow a parent or administrator to control Internet access by designation of a range of time when most Internet access will be limited to a narrow range of services.

BRIEF DESCRIPTION OF THE DRAWINGS

Additional objects and features of the disclosure will be more readily apparent from the following detailed description and appended claims when taken in conjunction with the drawings, in which:

Like reference numerals refer to corresponding parts throughout the several views of the drawings.

DETAILED DESCRIPTION

Figure 1:
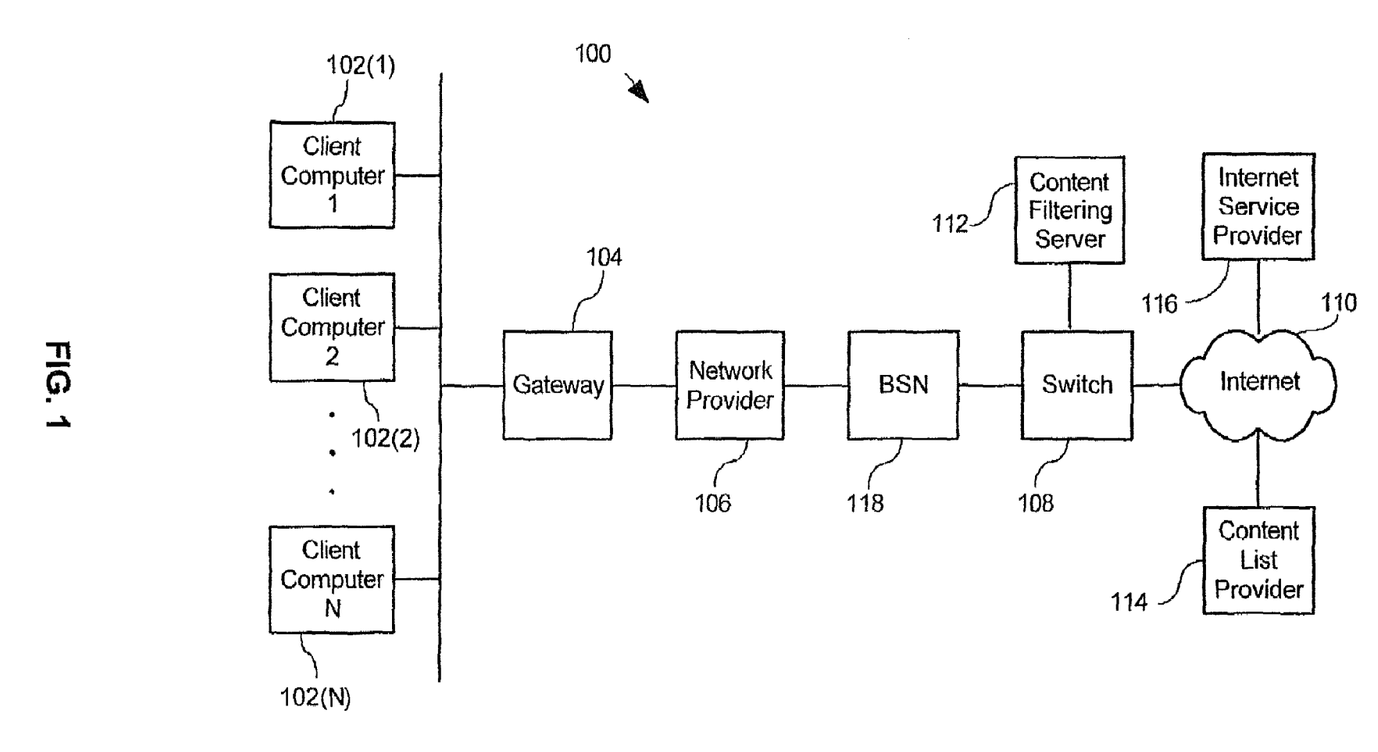
FIG. 1 is a block diagram of the system architecture according to an embodiment of the present disclosure.

FIG. 1 is a diagrammatic view of a content filtering system 100 according to an embodiment of the disclosure. The content filtering system 100 prevents a user's access to unauthorized content located on a network, such as the Internet 110. Unauthorized content may include undesirable, inappropriate, or extreme content, such as violence, hate, gambling or adult content.

One or more client computers 102(1)-(N) are coupled to a gateway 104 by any suitable means, such as Ethernet, cable, phone line, optical fiber, wireless, or the like. The client computers 102(1)-(N) include any computing device, such as desktop computers, laptop computers, handheld computers, or the like. Each of the client computers 102(1)-(N) includes network access software, such as an Internet Browser like MICROSOFT'S INTERNET EXPLORER or NETSCAPE'S NAVIGATOR. Unlike the prior art, such network access software does not need to be specially configured for the content filtering system 100. In fact, no filtering software needs to be present on the client computers 102(1)-(N) whatsoever.

Each client computer 102(1)-(N) is preferably uniquely identifiable by an Internet Protocol (IP) address. An IP address is generally a 32-bit numeric address written as four numbers separated by periods, such as 10.5.1.4. This sample address contains two pieces of information: a network identifier and a host identifier, where a host is any device that is attached to the network and uses the Transmission Control Protocol/Internet Protocol (TCP/IP) protocol.

Figure 2:
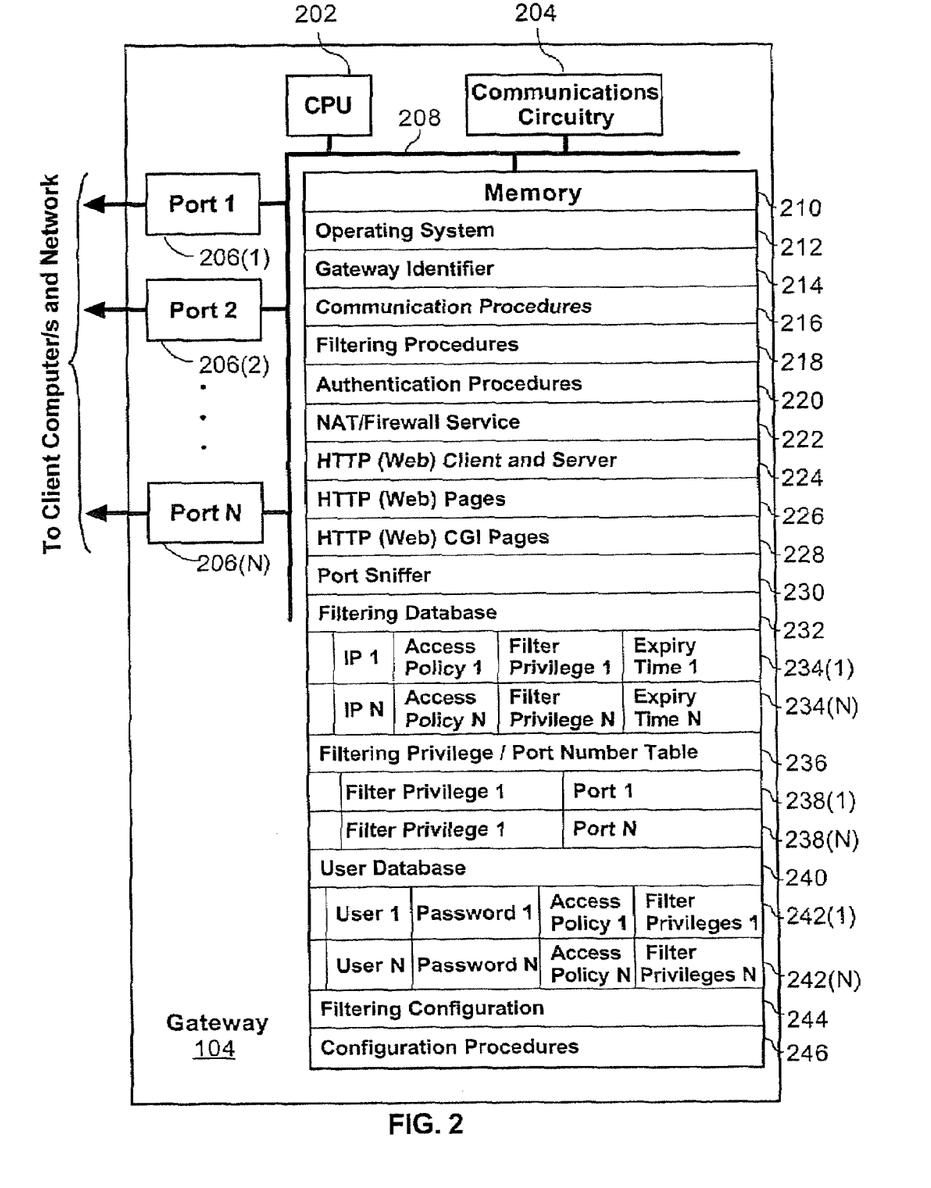
FIG. 2 is a block diagram of the gateway shown in FIG. 1.

The client computers can be assigned IP addresses from a subnet of routable IP addresses or from a subnet of private non-routable IP addresses defined by the IETF RFC 1597. If a subnet of private non-routable IP addresses is used for the client computers then the Gateway 104 can provide Network Address Translation (NAT) services 222 to translate from a table the non-routable IP addresses to a routable IP address that can be routed in the Internet.

The gateway 104 is any device capable of providing communication between the client computers 102(1)-(N) and the Internet 110 and may include dial-up modems, cable modems, DSL modems, satellite modems, or the like. Further details concerning the gateway 104 are described below in relation to FIG. 2.

The gateway 104 in turn connects to a network provider 106, such as SBC or BELL SOUTH. The network provider 106 then connects to the Internet 110 through a Broadband Service Node (BSN) 118 and at least one switch 108. The BSN 118 allows service providers to aggregate tens of thousands of subscribers onto one platform and apply highly customized IP services to these subscribers. A suitable BSN is NORTEL NETWORK's SHASTA 5000. The switch 108 is preferably a layer 4 switch, such as a SERVERIRON Web Switch made by FOUNDRY NETWORKS, or an ALPINE series switch made by EXTREME NETWORKS, both of California U.S.A. Alternatively, the BSN can apply a "Web Steering Policy" for individual users. With this feature, users of the content filtering service can have their traffic redirected to the content filtering server.

A content filtering server 112 is in turn coupled to the switch 108. The content filtering server 112 provides content filtering and blocking functionality to users of the client computers 102 and is described in further detail below in relation to FIG. 3.

The content filtering server 112 preferably comprises a CACHEFLOW Internet caching appliance and/or a number of INKTOMI Traffic servers that perform network caching server functions and work with content filtering databases provided by WEBSENSE or SURFCONTROL (both of California U.S.A.). They also have the ability to simultaneously listen transparently to HTTP requests destined to multiple arbitrary port numbers. In transparent mode the Network Cache servers will accept HTTP requests with destination IP addresses for other servers on the Internet.

The switch 108 in turn couples to the Internet 110. A content list provider 114, such as WEBSENSE or SURFCONTROL, is also coupled to the Internet 110. The content list provider 114 generates and provides a list of content and its associated content category, such as hate, violence, religion, and adult categories. WEBSENSE and SURFCONTROL's list of content currently exceeds 2.6 million Web sites, covering 500 million Web pages.

Finally, an Internet Service Provider (ISP) 116 is also coupled to the Internet 110. The ISP 116 provides the systems, methods, and protocol for provisioning and administering the content filtering service for the user. This is done by communicating data, such as configuration details and software, to and from the gateway 104.

FIG. 2 is a block diagram of the gateway 104 shown in FIG. 1. Gateway 104 preferably comprises at least one data processor or central processing unit (CPU) 202, a memory 210, communications circuitry 204, communication ports 206(1)-(N), and at least one bus 208 that interconnects these components. The communications circuitry 204 and communication ports 206(1)-(N) preferably include one or more Network Interface Cards (NICs) configured to communicate over Ethernet with the client computers 102(1)-(N).

Memory 210 preferably includes an operating system 212, such as VXWORKS or EMBEDDED LINUX, having instructions for communicating, processing, accessing, storing, or searching data, etc. Memory 212 also preferably includes a unique gateway identifier 214, such as serial number; communication procedures 216; filtering procedures 218; authentication procedures 220; a Network Address Translation (NAT)/Firewall service 222; a HTTP (Web) Client and Server 224; HTTP (Web) Pages 226; HTTP (Web) Common Gateway Interface (CGI) pages 228; a port sniffer 230; a filtering database 232; a filter privilege /port number table 236; a user database 240; filtering configuration details 244; and configuration procedures 246.

The communication procedures 216 are used for communicating with both the client computers 102(1)-(N) (FIG. 1), and the Internet 110 (FIG. 1). The filtering procedures 218 are used for filtering content from the Internet 110 (FIG. 1). The authentication procedures 220 are used to authenticate a user for content filtering services. The NAT/Firewall service 222 converts a local IP address of each client computer 102(1)-(N) (FIG. 1) into a globally routable IP address for the Internet and vice versa. It also serves as a firewall by keeping individual IP addresses of the client computers hidden from the outside world.

The HTTP (Web) Client and Server 224 requests and serves the HTTP (Web) Pages 226. The HTTP (Web) CGI Pages 228 are web server programs that allow customized content to be returned to a client browser. The port sniffer 230 is used for detecting and identifying port numbers associated with outgoing requests for content. In a TCP/IP-based network such as the Internet, the port number is a number assigned to an application program running on a computer. The port number is used to link the incoming data to the correct service. For example, port 80 is used for HTTP traffic (Web traffic).

The filtering database 232 contains a list of IP addresses for each client computer 102(1)-(N) connected to the gateway 104. This filtering database 232 is dynamic and entries are placed in the database after a user has successfully authenticated against the user database 242. Each IP address has an access policy, filter privilege and expiry time entry associated with it (234(1)-(N)).

Each access policy includes user data, such as user time restriction settings. For example, a user may have an access policy that allows Internet access only from 3:30 p.m. to 8:30 p.m. The filter privilege indicates a user's level of access to content to the network. Each filter privilege is associated, by the content filter server's filtering procedures 330, with sets of filter categories selected from categories such as adult content, hate, violence, gambling, etc. 334(1)-(N) (FIG. 3) or with a White List of URLs such as a list of kid friendly education URLs.

Furthermore, the filter privilege is typically associated with the age of the user and is used in a similar manner to the movie rating system of G, PG, etc. For example, a particular filter privilege may allow a particular user/client computer to access all content on the Internet except for adult, hate, and gambling content and, therefore, is associated with the set of exclusionary content categories of adult, hate, and gambling.

A filter privilege may also be associated with a White list of content that should not be filtered, such as a White List of child friendly sites, etc. The White list of content is used in an inclusive manner that only allows a user to visit the sites on the White list.

In use, the filter privileges range from most restrictive to least restrictive and the default filter privilege is set to the most restrictive filter privilege. For example, the filter privileges may have a range from 1 to 3, with filter privilege 1 associated with children under 10 years which allows access only to a White List of child friendly web sites; filter privilege 2 associated with teens from 10 to 13 years which restricts access to adult, hate, gambling, violence, and drugs content; and filter privilege 3 associated with teens from 14 to 17 which restricts access to adult and drugs content. The default filter privilege in this example would be set to filter privilege 1.

The expiry time is the time at which the user's filter privileges on a particular client computer will expire. For example, a user of a particular client computer may have access to certain content for an hour before the filter privilege expires and thereafter the user has to reauthenticate by resupplying his/her content filtering username and/or password.

In an alternative embodiment, the expiry time will lapse a set amount after no further requests for content are received from the client computer having that particular IP address. For example, if the user is inactive for 10 minutes, the system will require the user to resupply his/her username and/or password before allowing access to content limited by the user's filter privilege. In either of the above described embodiments, the default state for the filter privilege is set to the lowest level, i.e., all potentially restricted content is blocked.

The filtering level/port number table 236 includes a predetermined list of filter privileges and arbitrary port numbers (238(1)-(N)) assigned to each filtering level. The use of this table is described in further detail below in relation to FIGS. 4A-4C.

The User database 240 preferably contains a list 242(1)-(N) of the username, password, access policy, and filter privileges for each user subscribed to the content filtering service.

The filtering configuration details 244 contains other information such as the type of service (for example, premium or standard), expiry timeout, etc. The configuration procedures 246 are used for supporting the protocol to and from the ISP 116 (FIG. 1) for remote configuration and administration of the content filtering service.

Figure 3:
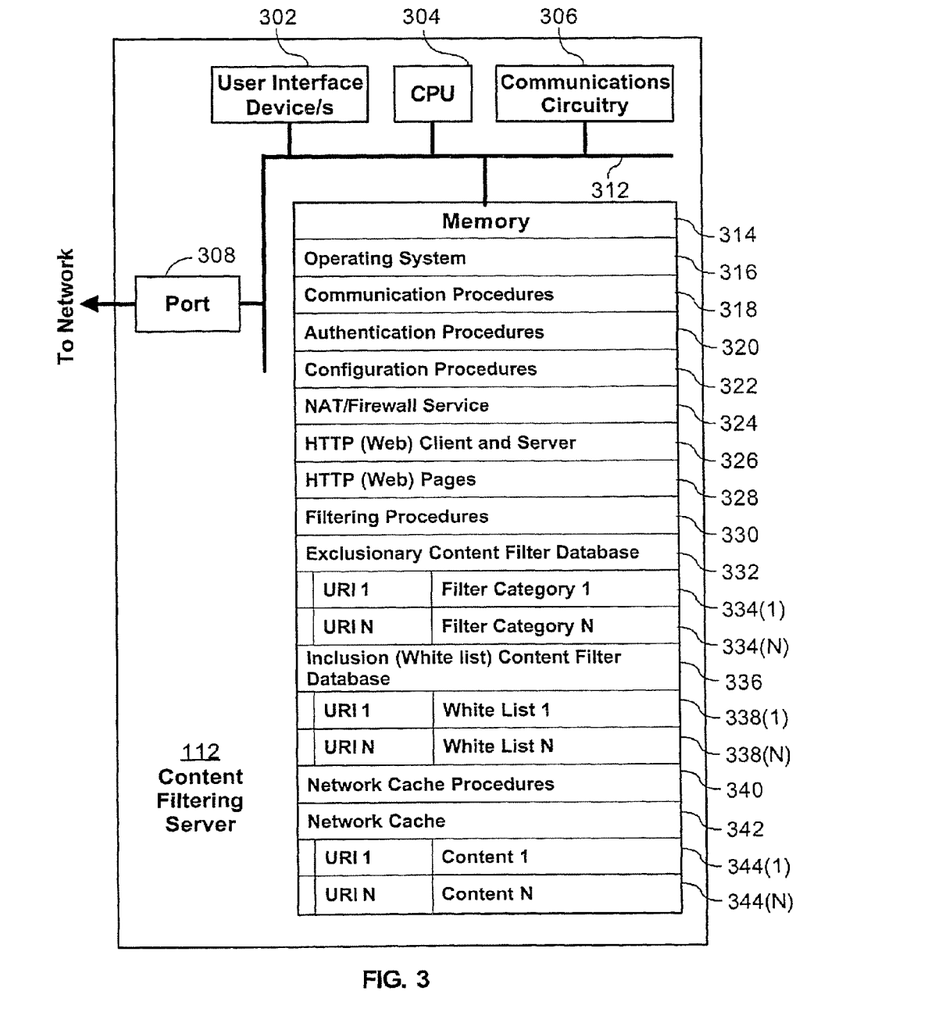
FIG. 3 is a block diagram of the Content Filtering Server shown in FIG. 1.

FIG. 3 is a block diagram of the content filtering server 112 shown in FIG. 1. The content filtering server 112 preferably includes at least one data processor or central processing unit (CPU) 304, a memory 314, communications circuitry 306, at least one communication port 308, user interface devices 302, and at least one bus 312 that interconnects these components. The communications circuitry 306 and communication port 308 allow for communication between the content filtering server 112 and the gateway 104 (FIG. 1).

Memory 314 preferably includes an operating system 316, such as LINUX, SUN SOLARIS, or MICROSOFT WINDOWS having instructions for communicating, processing, accessing, storing, or searching data, etc. Memory 314 also preferably includes communication procedures 318; authentication procedures 320; configuration procedures 322; a NAT/firewall service 324; a HTTP (Web) client and server 326; HTTP (Web) CGI pages 328; filtering procedures 330; an exclusionary content filter database 332, inclusion (White list) content filter database 336, network cache procedures 340, and a network cache 342.

The communication procedures 318 are used for communicating with the Internet 110 (FIG. 1) and the gateway 104 (FIG. 1). The authentication procedures 320 authenticate administrators of the server. The HTTP (Web) client and server 326 request and serve the HTTP (Web) CGI pages 328. The filtering procedures 330 are used to manage and control access to content on the Internet 110 (FIG. 1). The filtering procedures 330 compare the user requested URI against the exclusionary content filter database 332 or the inclusion (White List) content filter database 336 and make decisions whether the URI Content is to be served or if a block page is to be served to the user.

Exclusionary content filter database 332 contains a list of URIs, and an associated filtering category 334(1)-(N) for each content entry. For example, the URI—http://www.adult-content.com—may be associated with filtering category 1, which is adult content. The inclusion (White list) content filter database 336 also contains a list of URIs and their associated White lists 338(1)-338(N).

The inclusion (White list) content filter database is used by the filtering procedures 330 in such a way that the user is only allowed to access URIs in the White list and access to any other URIs returns a block page. The network cache procedures 340 and network cache 342 are used to temporarily cache URI's and their respective content 344 to improve response time to the user and to save network bandwidth. By caching frequently requested content the content filtering server 112 can deliver content faster since it does not need to first request the content from a content server (not shown) also coupled to the Internet. What is more, network bandwidth is saved since the content filtering server 112 is closer in a network sense to the client computers 102(1)-(N) than other content servers coupled to the Internet.

Figure 4A:
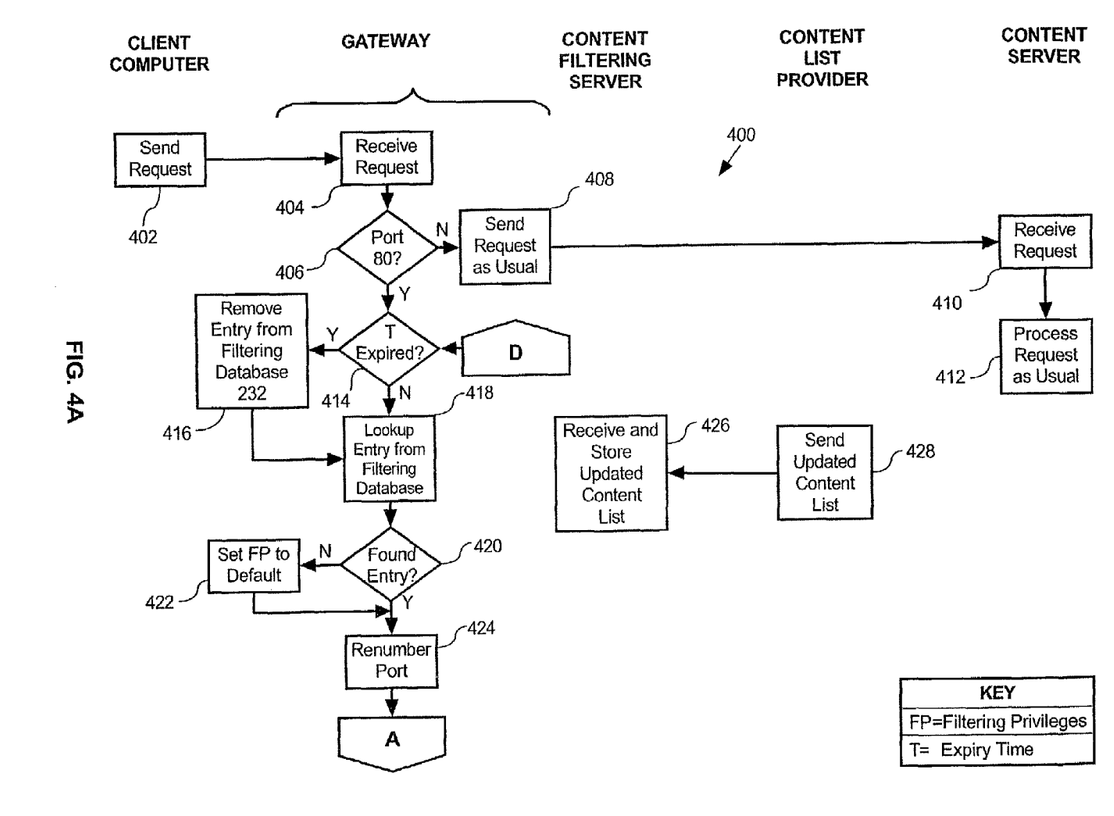
FIGS. 4A-4C are flow charts of a method for content filtering according to an embodiment of the present disclosure.
Figure 4B:
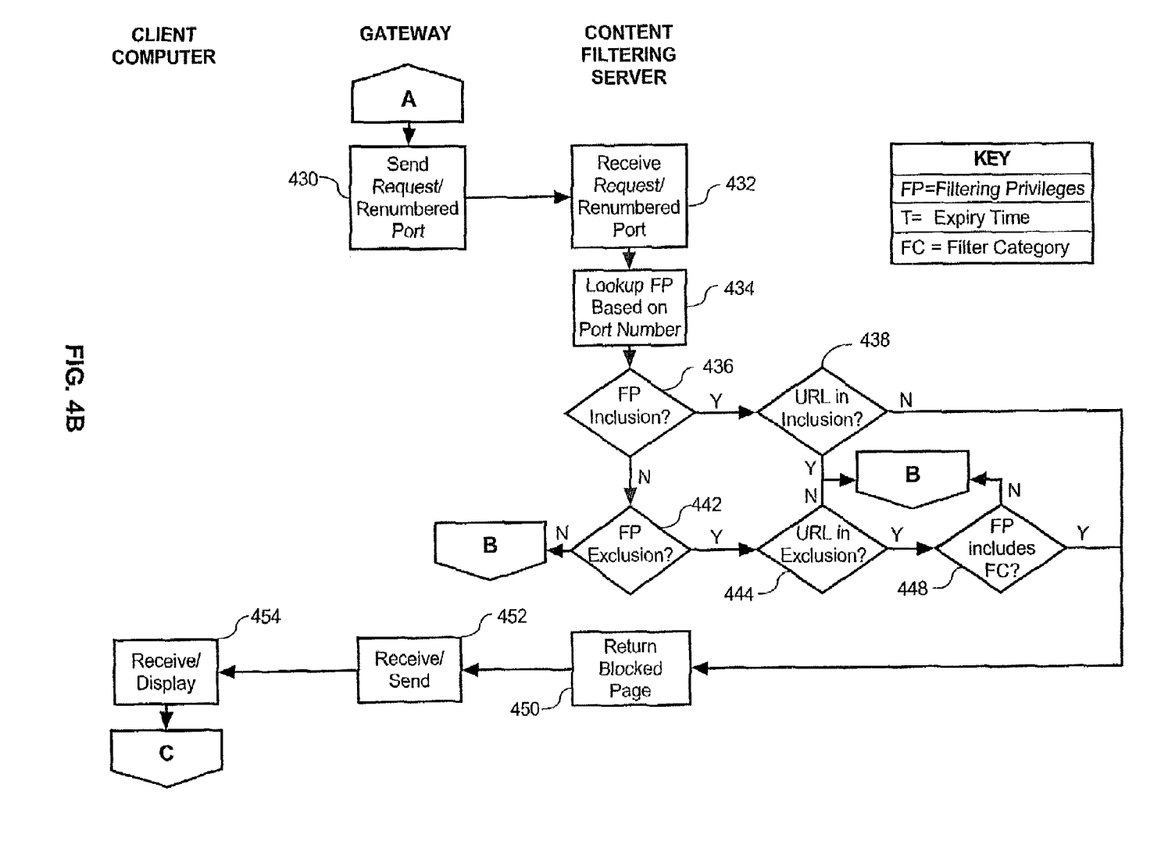
Figure 4C:
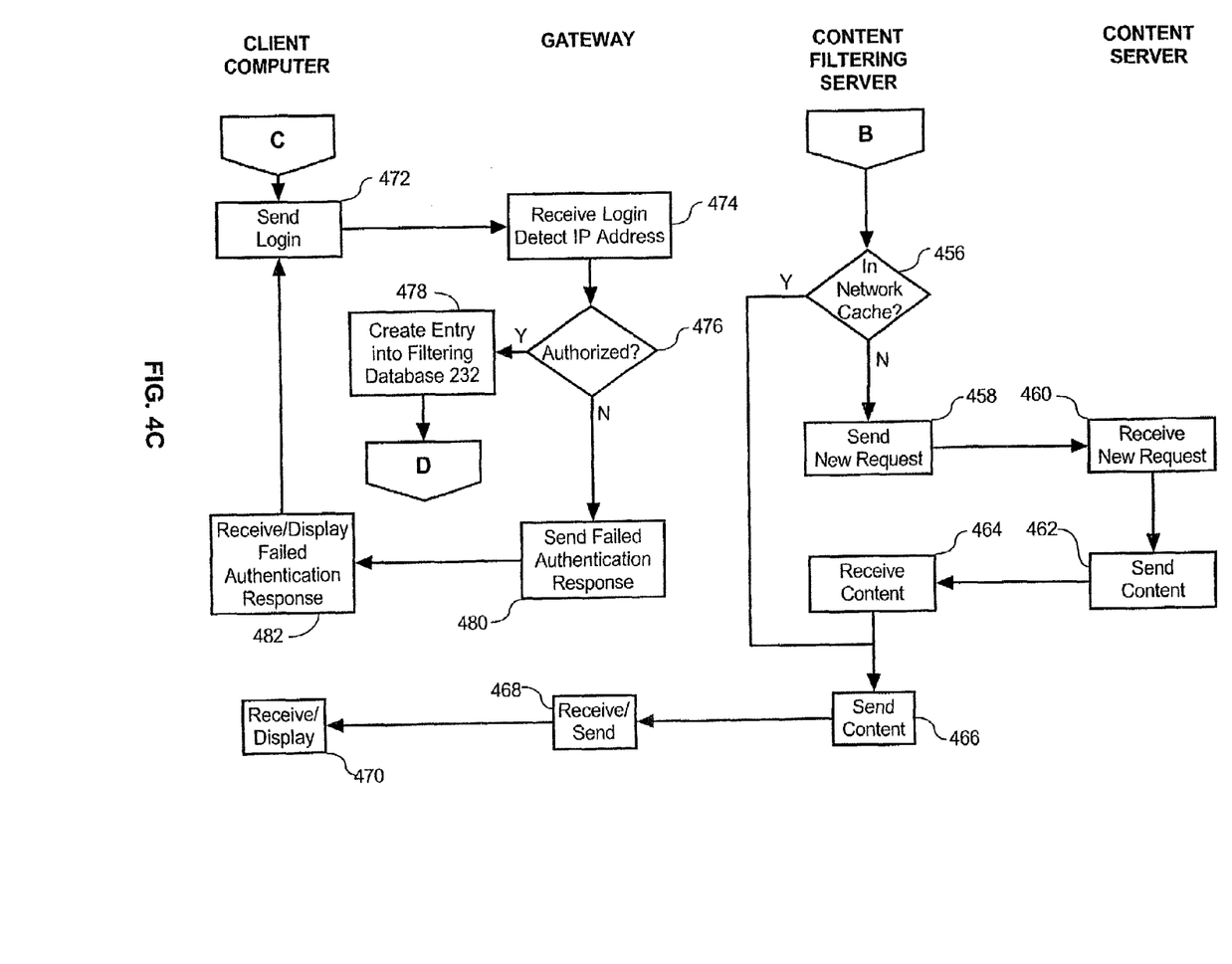

FIGS. 4A-4C are flow charts of a method 400 for content filtering according to an embodiment of the present disclosure. To subscribe to the content filtering service, users preferably connect to a membership Web page at the ISP 116 where they can subscribe to the content filtering system. Once the request for the content filtering service is received, the ISP downloads a software image containing the content filtering service feature to the gateway 104. A parent or administrator of the content filtering service is preferably provided with an administration username and password that enables the parent or administrator to update, re-configure, or temporarily deactivate the content filtering service and create user accounts and associate an access policy, filter privilege, and expiry timeout, to each account. For example a user account for username Brian can be created and associated with an access policy that allows Internet access from 1 p.m. to 9 p.m. daily and associated with a filter privilege of 2 and an expiry timeout of 2 hours. In this example filter privilege 2 can be associated with teens from 10 to 13 years and associated with port number 9013 in the filtering privilege/port number table 236.

After the administrator or parent has initially created a content filtering configuration, used a default content filtering configuration, or made a change to an existing content filtering configuration, the ISP 116 (FIG. 1) uses a configuration procedure to send the configuration to the gateway, thereby updating the user database 242 (FIG. 2), filter privilege/port number table 236 (FIG. 2), and filtering configuration details 246 (FIG. 2). The gateway is now provisioned for the content filtering service.

To initiate the method for content filtering, a user sends 402 a request for content from a client computer 102(1)-(N) (FIG. 1) to the gateway 104 (FIG. 1) using the HTTP (Hypertext Transfer Protocol) protocol. The user may do this by entering a URL into network access software, such as MICROSOFT'S INTERNET EXPLORER, on the client computer, or by selecting a Hyperlink. The request is received 404 by the gateway. All communication with the gateway is performed by the communication procedures 216 (FIG. 2).

The port sniffer 230 (FIG. 2) on the gateway then determines 406 whether the request was sent out on a specific TCP destination port, such as port 80. Port 80 indicates that the request is for HTTP content, as opposed to other content such as instant messaging, or the like. This is used to filter requests for HTTP content only and not other communications between the client computer and the gateway. If it is determined that the request was not sent out on the specific port (406-No), then the request is sent 408 as usual to a content server that stores and serves the requested content. The content server receives 410 the request and processes 412 the request as usual, i.e., by obtaining the content and sending it back to the client computer.

If it is determined that the request was sent out on the specific port (406-yes), then the filtering procedures 330 (FIG. 3) determine if the expiry time has expired 414 for the specific client computer making the HTTP request for content. This is determined by matching the source IP address for the client computer from where the request originated with the associated expiry time in the filtering database 232 (FIG. 2). If the expiry time has expired (414-Yes), then the entry in the filtering database 232 (FIG. 2) for the specific user (IP address) is removed which results in the user's filter privilege being set to the default filter privilege level, i.e., the most restrictive filter privilege level. The expiry time can be an inactivity based timeout or a set time period.

If the expiry time has not expired (414-No), or the user's filter privilege has been set to the default filter privilege level 416, then the filtering procedures 218 (FIG. 2) check the filtering database 232 (FIG. 2) to determine 418 if an entry exists for the source IP address of the client computer. If the source IP address for the client computer is not in the filtering database (420-No), or the source IP address for the client computer is in the filtering database but not known, then the user has not logged into the content filtering system and the user's filter privilege is set 422 to the most restrictive filter privilege. The TCP destination port 80 is then renumbered 424 to the default port associated with the most restrictive filter privilege.

If the source IP address for the client computer is in the filtering database (420-Yes), and the filter privilege 234(1)-(N) (FIG. 2) for the client computer that made the request is known, then the user has recently logged in to the filtering service and the TCP destination port 80 is renumbered 424 to the port number associated 424 with the user's filter privilege from the filtering privilege/port number table 236 (FIG. 2).

The user's HTTP request with the TCP destination port number renumbered 424 from port 80 to the port number associated with the user's filter privilege (from the filtering level/port number table 236) is then sent 430 from the gateway 104 (FIG. 1) to the service provider network 106 (FIG. 1). When the HTTP request passes to the switch 108 (FIG. 1), the switch forwards all TCP traffic having destination port numbers equal to the arbitrary port numbers, which are associated with the filter privileges from the filtering privilege/port number table 236 (FIG. 2), to the content filtering server 112 (FIG. 1). Alternatively, the BSN 118 (FIG. 1) has the capability of applying a "Web Steering Policy" for individual subscribers. With this feature, subscribers of the content filtering service can have their traffic redirected to the content filtering server 112 (FIG. 1), while those who do not subscribe will have their traffic sent directly to the Internet 110 (FIG. 1).

However, in the BELL ATLANTIC region, subscribers share Permanent Virtual Circuits (PVCs). The current NORTEL SHASTA 5000 software version 1.5 cannot support applying a "Web Steering Policy" for individual subscribers who share PVCs, therefore an IP demultiplexer feature is applied based on a subscriber's IP address. This effectively applies a "Web Steering Policy" for individual subscribers in this region.

The content filtering server is configured to be able to listen to the arbitrary port numbers in a transparent network cache mode. In this mode the server will accept HTTP requests even though the destination IP addresses are destined for content servers coupled to the Internet.

The content filtering server then receives 432 the URL in the HTTP request for content and looks up 434 the filter privilege to associate with the request based on the renumbered TCP destination port number. Each filter privilege is associated with sets of exclusionary content categories or a White list of content.

The filtering procedures 230 (FIG. 2) then determine 436 if the filtering privilege is associated with a White list. If the filter privilege is associated with a White list (436-Yes), then the filter server, using the filtering procedures, checks 438 if the URI in the HTTP request is in the inclusion (White list) content filter database 336 (FIG. 3). If the URI exists in the inclusion content filter database (438-Yes), then the URI is not filtered/blocked and the content filtering server uses its network cache procedures 340 (FIG. 3) to return the requested content to the client computer. This is done by firstly checking 456 if the content addressed by the URI is in the network cache 342 (FIG. 3). If the content addressed by the URI is in the network cache (456-Yes), then the content is retrieved from the network cache and sent 466 through 468 the gateway to the client computer, which receives and displays 470 the content. The gateway also changes 468 the source port from the port associated with the filter privilege back to port number 80 so that the client computer will recognize the content as the requested content.

If the content addressed by the URI is not in the network cache (456-No), then the content filtering server sends 458 a new request for content to the content server addressed by the URI. The content server receives 460 the request, locates the content and sends 462 the content back to the content filtering server. The content filtering server receives 464 the content and stores the content in the network cache. The content filtering server then sends 466 the content through 468 the gateway to the client computer, which receives and displays 470 the content. The gateway also changes 468 the source port from the port associated with the filter privilege back to port number 80 that the client computer will recognize the content as the requested content.

If the URI does not exist in the inclusion content filter database (438-No), then the URI is not filtered/blocked and the content filtering server returns 450 a blocked Web page through 452 the gateway to the client computer informing 454 the user that the requested content has been blocked by the content filtering service. The user may then login to the content filtering service to view the blocked content, as explained below.

If the filter privilege is not associated with a White list (436-No), then the filtering procedures 230 (FIG. 2) determine 442 if the filtering the privilege is associated with any filter categories in the exclusionary content filter database 332 (FIG. 3). If the filter privilege is associated with a set of exclusionary content categories (442-Yes), then the content filter server using filtering procedures 230 (FIG. 2) determines 444 if the URI in the HTTP request is in the exclusionary content filter database 332 (FIG. 3).

If the URI is in the exclusionary content filter database (444-Yes), then the filtering procedures determine 448 if the filter category associated with the URI is in the set of exclusionary content categories associated with the filter privilege. If the filter category associated with the URI is in the set of exclusionary content categories associated with the filter privilege (448-Yes), then the URL is to be blocked and a blocked Web page is returned 450 through 452 the gateway to the client computer informing 454 the user that the requested content has been blocked by the content filtering service. The user may then login to the content filtering service to view the blocked content, as explained below.

If the URI is not in the exclusionary content filter database (444-No), or if the filter category associated with the URI is not in the set of exclusionary content categories associated with the filter privilege (448-No), then the URI is not filtered or blocked and the content filtering server uses its network cache procedures 340 (FIG. 3) to return the requested content to the client computer as explained above.

If the user has received a blocked Web-page (454), he/she may login to the content filtering service to change his/her filter privilege for the client computer in use. The blocked web page preferably allows the user to send 472 login details, such as a username and password, to the gateway. Once the login details are sent 472, the gateway receives 474 them and detects the source IP address of the computer from where the login details came.

The user database 240 (FIG. 2) on the gateway contains a list of login details, such as usernames, passwords, and filter privileges, for all users. This list is periodically downloaded, or sent, to the gateway from the Internet Service Provider 116 (FIG. 1).

The authentication procedures 220 (FIG. 2) then determine 476 if the supplied login details are correct by checking them against the user database. If a user successfully authenticates through a match of their login details against the user database (476-Yes), then an entry is created 478 in the filtering database 232 (FIG. 2) for the user. This entry 234(1) to (N) contains the IP address of the client computer that the user is using, based on the IP address of the authentication request, filter privilege for the level of access to content that the user is allowed, and an expiry time when the user's filter privilege will expire. The filtering process is then repeated (414 etc.) for the new filtering privilege.

If the login details cannot be authenticated (476-No), then a failed authentication notification is sent 480 to the client computer and no entry is created in the filtering database 232 (FIG. 2). The failed authentication notification is received and displayed 482 by the client computer and the authentication process is repeated until the user is authenticated or makes a new request for content.

For example, if the user is provisioned with a filter privilege which blocks the user from viewing adult content which is associated with port number 9013. The default filter privilege is a White list of only educational Web sites associated with port number 9012. If, before the user authenticates, he/she requests gambling content the request will be blocked by the content filtering server because by default the traffic will be censored by the default filter privilege. Once authenticated, the TCP destination port number is changed from 80 to 9013, instead of 9012, in the gateway's filtering database. The switch will then forward future requests to the content filtering server, which now allows the gambling content because this content is allowed for the filter privilege associated with port number 9013.

In addition, if the user is provisioned with the filter privilege of unrestricted access, then the user's filter privilege is set to unrestricted which is associated with port number 80. When the user successfully authenticates against the gateway's user database 242 (FIG. 2) an entry in the filtering database is created with the unrestricted filter privilege. When the gateway receives requests from the client computer that the user is using, the gateway will not renumber the TCP destination port number. Therefore the user's HTTP traffic passes unaltered through the gateway 104 (FIG. 1), is not forwarded to the content filtering server, and passes uncensored to the Internet 110 (FIG. 1).

The content filter databases 332 and 336 (FIG. 3) are preferably updated through a subscription with content filtering services providers. The content filter databases can be automatically updated at any time, such as weekly or daily. The content filtering service 114 (FIG. 1) sends 428 an updated content list to the content filtering server 112 (FIG. 1), which is preferably sent via the Internet and preferably contains a exclusionary list of URIs and associated filter categories 334(1)-(n), and an inclusion list of URIs and an associated white list 238(1)-(n) (FIG. 3). This content list is received and stored 426 in the exclusionary content filter database 332 and inclusion (white list) content filter database 336 (FIG. 3) of the content filtering server.

The above content filtering system, therefore, either displays the user's requested content or displays a blocked Web page depending on the user's filter privilege. This process is repeated for each new request for content.

An advantage of the content filtering process is that because the content filtering process is managed through the gateway, the filtering requirements and criteria only need to be set up once, and all client computers are automatically subject to the filtering service. In this way, individual devices do not need to be individually configured. In addition, the filtering process does not require restricting users to only certain devices in order for the filtering process to be effective. Additionally, the filtering process requires little user interaction. Updating the content filter database on the content filtering server is preferably performed automatically.

The disclosure disclosed herein provides numerous benefits. For example, the system preferably allows the parent or administrator to set-up a time-out value wherein after a certain period of time a user's filter privileges are reset. Also, if a session is inactive for a predetermined period of time, user's filter privileges may be reset. When next requesting restricted content, the user will be required to reauthenticate.

While the foregoing description and drawings represent the preferred embodiment of the present disclosure, it will be understood that various additions, modifications and substitutions may be made therein without departing from the spirit and scope of the present disclosure as defined in the accompanying claims. In particular, it will be clear to those skilled in the art that the present disclosure may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the disclosure being indicated by the appended claims, and not limited to the foregoing description. Furthermore, it should be noted that the order in which the process is performed may vary without substantially altering the outcome of the process.

What is claimed is:

1. A method comprising:

determining a filter privilege of a user associated with a client computer in response to a request for content including a first port number and a Uniform Resource Locator (URL);

renumbering said request for content with a second port number based on said filter privilege;

transmitting said request for content with said second port number to a content filtering server that is configured to listen for requests on said second port number;

when the filter privilege is associated with an inclusion list and the URL is within the inclusion list, returning requested content to the client computer;

when the filter privilege is not associated with the inclusion list and is within an exclusionary list and the URL is not in the exclusionary list, returning requested content to the client computer.

2. A method as recited in claim 1 further comprising receiving login details from said client computer; and
authenticating the user of said client computer based on said login details.

3. A method as recited in claim 2 wherein the step of determining a filter privilege comprises determining the filter privilege based on said login details.

4. A method as recited in claim 1 wherein the step of transmitting said request for content with the second port number comprises transmitting an HTTP request from the client computer.

5. A method as recited in claim 1 wherein transmitting the request for content with the second port number comprises transmitting the request to a switch which redirects the request for content having one of a plurality of predetermined port numbers to the content filtering server.

6. A method as recited in claim 1 wherein returning requested content to the client computer when the filter privilege is associated with an inclusion list and the URL is within the inclusion list comprises changing the second port number to the first port number.

7. A method as recited in claim 1 further comprising when the filter privilege is associated with the inclusion list and when the URL is not in the inclusion list, communicating a notification of blocked content.

8. A method as recited in claim 1 further comprising when the filter privilege is associated with the exclusionary list and when the URL is in the exclusionary list, communicating a notification of blocked content.

9. A method as recited in claim 1 further comprising when the filter privilege is not associated with an inclusion list and is within an exclusionary list, when the URL is within the exclusionary list and when the filter privilege is not included in a filter category, returning requested content.

10. A method as recited in claim 1 further comprising, when the filter privilege is associated with the exclusionary list, when the URL is in the exclusionary list and when the filter privilege does include a filter category, communicating a notification of blocked content.

11. A method as recited in claim 1 wherein the step of returning requested content to the client computer comprises returning requested content to the client computer from a network cache.

12. A method as recited in claim 1 wherein the step of returning requested content to the client computer comprises returning requested content to the client computer though an Internet when the requested content is unavailable from a network cache.

13. A system interacting with a client computer having a user associated therewith, said system comprising:

a gateway receiving a request for content from the client computer, said request including a first port number and a URL, said gateway renumbering said request for content with a second port number based on said filter privilege and transmitting the request; and a content filtering server in communication with the gateway, said content filtering server configured to listen for a request for content on said additional port number, said content filtering server receiving the request for content from the gateway, when the filter privilege is associated with an inclusion list and the URL is within the inclusion list, said content filtering server returning requested content and, when the filter privilege is not associated with an inclusion list and is within an exclusionary list and the URL is not in the exclusionary list, said content filtering server returning requested content.

14. A system as recited in claim 13 further comprising a switch coupled to said gateway, said content filtering server, and at least one content server, wherein said switch is configured to listen for said request on said new port number and to redirect said request to said content filtering server.

15. A system as recited in claim 13 wherein the request to the client computer when the filter privilege is associated with an inclusion list and the URL is within the inclusion list comprises an HTTP request from the client computer.

16. A system as recited in claim 13 wherein the content filtering server changes the second port number to the first port number to obtain the requested content.

17. A system as recited in claim 13 wherein the content filtering server communicates a notification of blocked content to the client computer when the filter privilege is associated with the inclusion list and the URL is not in the inclusion list.

18. A system as recited in claim 13 wherein the content filtering server communicates a notification of blocked content to the client computer when the filter privilege is associated with the exclusionary list and the URL is in the exclusionary list.

19. A system as recited in claim 13 wherein the content filtering server determines a filter category associated with the URL, said content filtering server allowing content to be returned to the client computer when the filter privilege is associated with the exclusionary content list, the URL is not in the exclusionary list and the filter privilege does not include the filter category.

20. A system as recited in claim 13 wherein the content filtering server determines a filter category associated with the URL, said content filtering server communicates a notification of blocked content to the client computer when the filter privilege is associated with the exclusionary list, the URL is in the exclusionary list and the filter privilege does include the filter category.

21. A system as recited in claim 13 further comprising a network cache returning requested content.

* * * * *